United States Patent [19]
Godfrey et al.

[11] Patent Number: 5,419,837
[45] Date of Patent: May 30, 1995

[54] HINDERED AMINES FOR TREATING INDUSTRIAL WATER SYSTEMS

[75] Inventors: Martin R. Godfrey, Elburn; David P. Workman, Naperville, both of Ill.

[73] Assignee: Nalco Chemical Company, Naperville, Ill.

[21] Appl. No.: 200,030

[22] Filed: Feb. 22, 1994

[51] Int. Cl.$^6$ .............................................. C02F 1/66
[52] U.S. Cl. .................................. 210/745; 210/749; 210/750; 210/757; 252/188.28; 422/11; 422/16; 436/111
[58] Field of Search ............... 210/698, 745, 750, 757, 210/749; 252/188.28; 422/11, 16; 436/111

[56] References Cited

U.S. PATENT DOCUMENTS

| | | | |
|---|---|---|---|
| 4,618,481 | 10/1986 | Heinzelmann et al. | 95/235 |
| 4,626,411 | 12/1986 | Nemes et al. | 210/750 |
| 4,728,497 | 3/1988 | Muccitelli | 210/750 |
| 4,847,001 | 7/1989 | Cuisia et al. | 252/188.28 |
| 4,891,141 | 1/1990 | Christensen et al. | 422/16 |
| 5,094,814 | 3/1992 | Soderquist et al. | 210/750 |
| 5,339,633 | 8/1994 | Fujii et al. | 423/220 |

OTHER PUBLICATIONS

National Assn. of Corrosion Engineers, "Corrosion Inhibitors", C. C. Nathan, pp. 212–213.
National Assn. of Corrosion engineers, "Corrosion Basics", 1984, p. 169.

*Primary Examiner*—Peter A. Hruskoci
*Attorney, Agent, or Firm*—Robert A. Miller; James J. Drake

[57] ABSTRACT

The present invention provides methods for treating industrial water systems. Pursuant to the method, the industrial water systems are treated with an effective amount of a hindered amine. In further embodiments, the hindered amine also acts as a steam tracer.

9 Claims, 3 Drawing Sheets

HINDERED AMINES FOR TREATING INDUSTRIAL WATER SYSTEMS

BACKGROUND OF THE INVENTION

The present invention generally relates to the treatment of industrial water systems to prevent corrosion damage. More specifically, the present invention relates to a method for treating an industrial water system to neutralize carbonic acid formed within the water system.

The primary considerations in the operation of industrial water systems, such as boiler systems, are maximizing energy efficiency and reliability, and eliminating unscheduled outages caused by water related problems. One economically attractive method is increasing the amount of condensate returned to the boiler as feedwater. Returned condensate, being condensed steam, is extremely pure and has a high heat content. Increased condensate return can improve boiler system economics through water and energy conservation.

As more condensate is returned, less make-up water is required, saving on water and make-up water treatment costs. The high purity allows for greater boiler cycles of concentration, thus reducing water and energy losses to blowdown. The high heat content (148 Btu/lb at 180° F.) can provide substantial energy savings.

Corrosion in condensate systems can limit the quality and/or quantity of returned condensate. Iron and copper corrosion products can deposit on boiler heat transfer surfaces. This corrosion reduces heat transfer efficiency and could cause tube failure. In addition, corrosion caused by carbonic acid also damages components and piping in the condensate system.

Gases in the steam that dissolve in condensate to form a corrosive solution cause the condensate corrosion. Common gases found in condensate systems are oxygen, carbon dioxide and ammonia. Carbon dioxide and oxygen are most corrosive to ferrous metals, while oxygen and ammonia are extremely corrosive to copper and copper alloys. Either carbon dioxide or oxygen cause corrosion; however, the presence of both accelerates the corrosion rate significantly (10-40% faster than the sum of corrosion rates occurring from either gas alone).

Carbon dioxide can be found in steam due to the decomposition of bicarbonate, carbonate, or internal treatment chemicals in the boiler. The major source of carbon dioxide in steam is the break down of feed water bicarbonate and carbonate alkalinity in the boiler. At boiler temperatures and pressures, the following reactions occur:

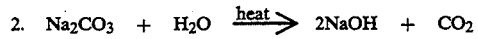

The first reaction proceeds 100% to completion. The second proceeds to approximately 80% completion. The liberated $CO_2$ is carried with the steam into the condensate system. It becomes apparent that high alkalinity feed water will produce extremely corrosive condensate.

Carbon dioxide is not harmful until it dissolves in condensate. When the steam condenses, the carbon dioxide reacts with water to form corrosive carbonic acid. Since condensate is extremely pure, even small quantities of carbonic acid can significantly lower condensate pH and increase corrosivity. Corrosion rates increase with increasing temperatures. Since condensate is hot, this causes condensate to be even more aggressive to metal surfaces.

Reduction of alkalinity in the feed water decreases the carbon dioxide within the steam. This reduction of alkalinity can be accomplished by a mechanical means such as a well controlled lime softening program, dealkalization, demineralization, or degasification processes. Alternatively or in addition to the mechanical means, a chemical treatment program, such as neutralizing amines, may be used to neutralize carbonic acid in the condensate. When the neutralizing amines are used in addition to the pretreatment program, naturally, a better pretreatment with mechanical means results in a lower required amine dosage.

Organic amines are added to boiler feed water to volatilize into the stream and neutralize the carbonic acid in the condensate system. A variety of amines are used for this purpose. Blends of amines having different vapor/liquid partition coefficients are also used for better protection of the entire condensate system. Blends are advantageous because amines with smaller vapor/liquid partition coefficients will condense in the initial parts of the system and those with larger coefficients will protect the end of the system.

While the organic amines previously used in feed water systems have provided some protection against corrosion, such organic amines have several disadvantages. For instance, amines are difficult to handle since they are toxic, odorous, and flammable. Further, the copper corrosion problem becomes much more severe when the system contains oxygen, so the use of amine containing boiler blowdown for cooling tower makeup is normally undesirable.

In addition, neutralizing amines can and often do participate in the corrosion mechanism of copper and copper alloys by forming soluble complexes with the copper ions. Nathan, *Corrosion Inhibitors*, National Association of Corrosion Engineers, pp. 212-213 (1973). The source of the copper is usually the condenser and feedwater heater tubes within the boiler systems. Ammonia or substituted ammonium compounds attack the copper alloys and form copper complexes. *Corrosion Basics*, National Association of Corrosion Engineers, p. 169 (1984).

Therefore, a need exists for a new chemical treatment program that effectively neutralizes the carbonic acid formed within the feed water, while not participating in the corrosion mechanism.

SUMMARY OF THE INVENTION

The present invention provides a chemical treatment program that effectively neutralizes carbonic acid formed within an industrial water system, while at the same time does not participate in the corrosion mechanism. The method of the present invention utilizes a hindered amine that can react with protons in the neutralization reactions but cannot react with transition metals in complexation reactions. Still further, the present invention provides a method for steam tracing within an industrial water system.

In an embodiment, the method of the present invention comprises the step of adding an effective amount of a hindered amine to an industrial water system.

In an embodiment, the hindered amine is 1,8-bis(-dimethylamino)naphthalene.

In an embodiment, the industrial water system is a boiler system.

In an embodiment, the present invention provides a method for steam tracing in an industrial water system. The method for steam tracing initially comprises the step of adding an effective amount of a hindered amine to the industrial water system. Then, the concentration of the hindered amine is detected throughout the industrial water system.

In an embodiment, the hindered amine is 1,8-bis(-dimethylamino)naphthalene.

In an embodiment, the concentration of the hindered amine is detected by measuring the ultraviolet absorption of the hindered amine.

An advantage of the present invention is that it utilizes a sterically hindered amine that can react with protons in neutralization reactions but cannot react with transition metals in complexation reactions. As a result, the hindered amine does not participate in the corrosion mechanism of copper and copper alloys by forming soluble complexes with copper ions.

Another advantage of the present invention is that it provides a chemical treatment program that poses little risk to the users of the method. In an embodiment, the hindered amine is 1,8-bis(dimethylamino) naphthalene. This chemical has no disagreeable odor and is non-flammable. Accordingly, handling of this compound poses little risk.

Another advantage is that 1,8 bis(dimethylamino) naphthalene is a stronger base than previously used amines. Therefore a lower dosage is needed to reach the desired pH. Since the proton sponge has a strongly temperature dependant vapor/liquid partition ratio (i.e. it is much more volatile at lower temperature) it may distribute itself throughout the condensate system more efficiently. It will have a greater tendency to condense in the first high pressure stages of the system but as temperature decreases it will be more likely to remain in the steam and go farther through the system.

Another advantage of the present invention is that it incorporates, in an embodiment, 1,8-bis(dimethylamino) naphthalene that has a magnitude of vapor/liquid partition ratio greater than prior used amines. As a result, the present invention provides a more efficient chemical treatment program.

Moreover, an advantage of the present invention is that it not only neutralizes carbonic acid but it also may act as a steam tracer.

Additional features and advantages of the present invention are described in, and will be apparent from, the detailed description of the presently preferred embodiments and the Figures.

DETAILED DESCRIPTION OF THE PRESENTLY PREFERRED EMBODIMENTS

Figure 1:
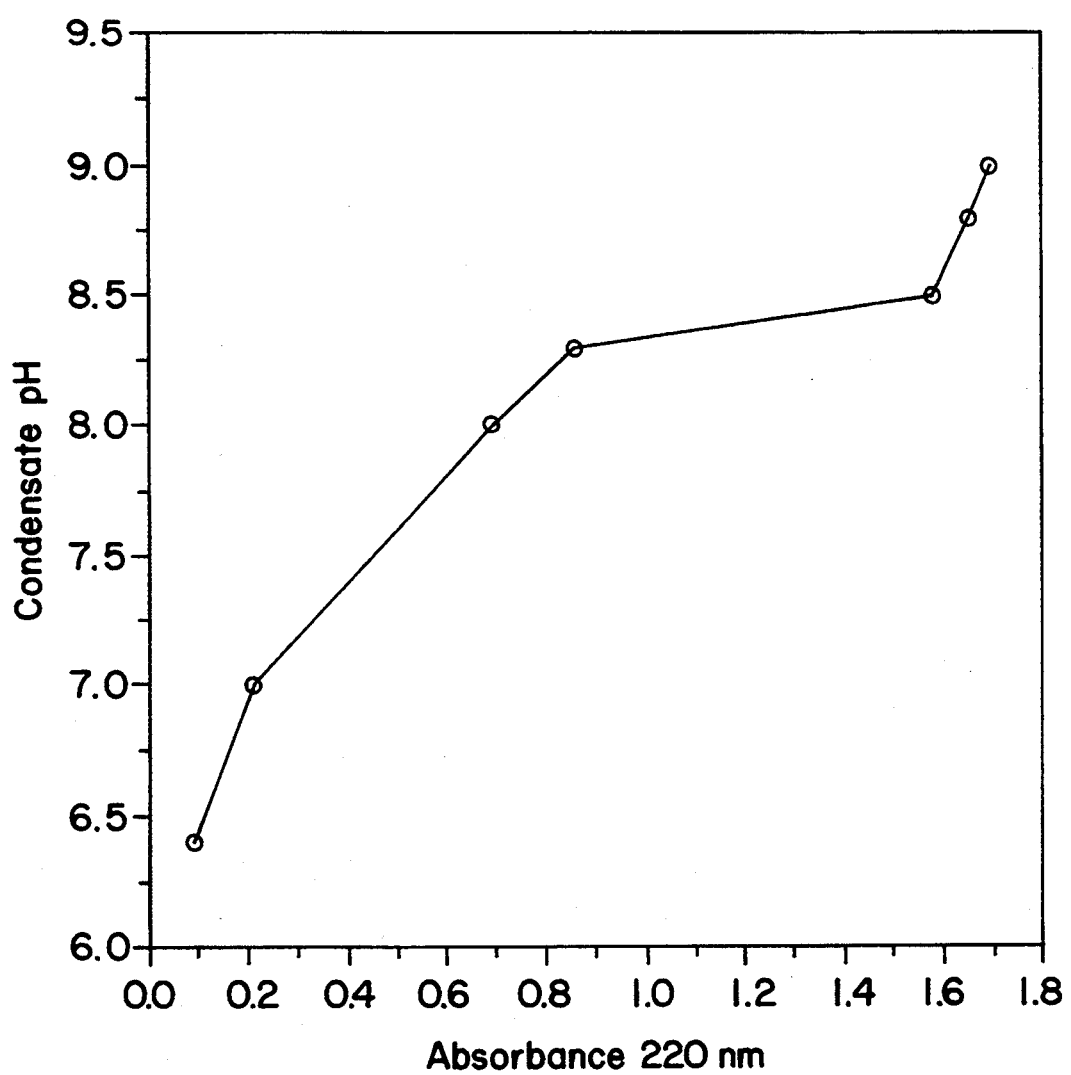
FIG. 1 illustrates graphically condensate pH versus absorbance (220 nm) for a system treated with a hindered amine pursuant to the present invention.

The present invention provides, for treating an industrial water system, a method that includes the addition of a hindered amine to the industrial water system. The hindered amine of the present invention can effectively neutralize carbonic acid as well as act as a steam tracer. Moreover, the amine functionality is sterically hindered so that neutralization can take place but the amine is prevented from being involved in a copper corrosion mechanism. Still further, the use of a hindered amine having a naphthalene group allows for direct detection of the molecule by UV absorption, thereby promoting use as a steam tracer.

Suitable amines that may be used in the present invention are those that are sterically hindered in such a way that they can react with protons in neutralization reactions but cannot react with transition metals, such as copper and iron, in complexation reactions. Additionally, suitable amines need sufficient solubility in water, such as boiler condensate, to raise the pH of the water to a value where ferrous metal corrosion is low. Preferably, the pH of the water is between 8.5 and 9.5.

An example of a suitable hindered amine that may be used in the present invention is 1,8-bis(dimethylamino)-naphthalene, commonly known as proton sponge. The proton sponge as well as the steric hindrance present within the molecule is represented below:

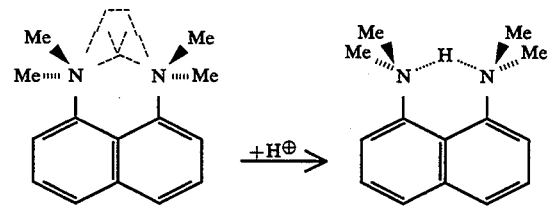

Other hindered amines, also called proton sponges, are: 4,5-bis(dimethylamino)phenanthrene, 4,5-bis(dimethylamine) fluorene, 1,8, bis(dimethylaminomethyl)-naphthalene, tris (dimethylamino)phenalenium ions, 1,4,5,8 tetrakis (dimethylamino)naphthalene. However, these compounds may not have sufficient water solubility for use in the present invention.

As illustrated above, 1,8-bis(dimethylamino) naphthalene is a strained molecule because of the close proximity of the dimethylamino groups. The free base is destabilized by steric inhibition of resonance, van der Waals repulsions, and lone pair interactions. These strains are relieved by monoprotonation and formation of an intramolecular N—H—N hydrogen bond. This results in anomalously large $pK_a$ value of 12.3 compared to 9–10 for normal aliphatic amines. The strong hydrogen bond and the steric hindrance of the methyl groups make diprotonation of this diamine impossible in normal aqueous solutions.

The inventors also believe that two possible modifications to the proton sponge molecule can be made that would increase the solubility of the proton sponge. Equations (1) and (2) below detail the anticipated synthesis of these molecules:

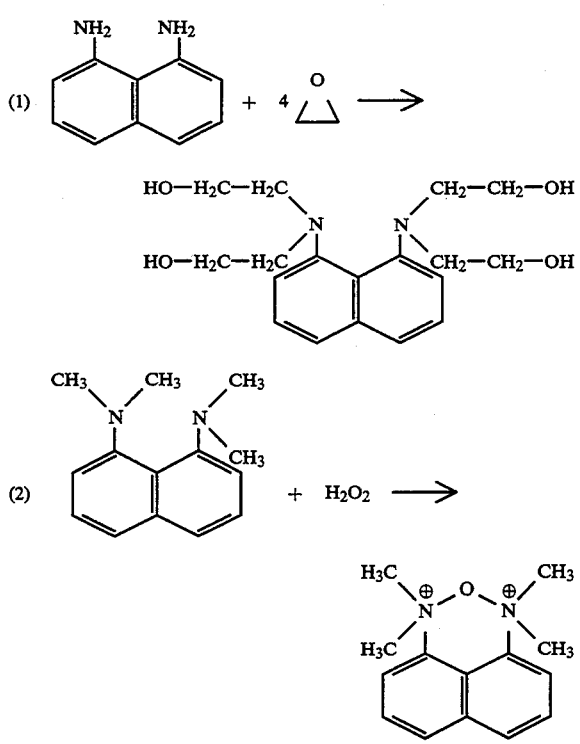

Pursuant to the method of the present invention, carbonic acid in an industrial water system can be neutralized without fear of copper alloy corrosion. In an embodiment, the method of the present invention involves the addition of an effective amount of a hindered amine to the industrial water system. In a preferred embodiment, the hindered amine is 1,8-bis(dimethylamino)naphthalene.

The optimal amount of the hindered amine required for effectiveness in this invention depends on the amount of carbon dioxide generated within the industrial water system. In high alkalinity feed water systems where carbon dioxide generation is appreciable, excessive amounts of the hindered amine may be required to neutralize the carbonic acid. An effective amount of the hindered amine is added to the industrial water system [in the steam condensate]to produce a pH between 8.5 and 9.5. The amine may be added to the boiler feedwater to volatilize into the steam or injected directly into the steam. This range will maximize corrosion protection since carbon dioxide does not exist above pH 8.3. In an embodiment, the hindered amine of the present invention is added in a range between 0.5 ppm-20 ppm.

The present invention also provides a method for steam tracing in an industrial water system. The method initially involves the step of adding an effective amount of a hindered amine to the industrial water system. Subsequently then, the concentration of the hindered amine is detected throughout the industrial water system. In an embodiment, the concentration of the hindered amine is detected by measuring the ultraviolet absorption of the hindered amine. Naturally, those skilled in the art will realize that other manners of detection may also be utilized and fall within the scope of the present invention.

In an embodiment, the hindered amine is 1,8-bis(-dimethylamino)naphthalene. The aromatic nature of this amine allows for the direct detection of the molecule by UV absorption at concentrations less than 100 ppb. As a result, the hindered amine can effectively be used as a steam tracer within the industrial water system.

By way of example, and not limitation, an experimental example of the present invention will now be given.

EXAMPLE

A hindered amine of the present invention was tested in a boiler water system. Specifically, the hindered, aromatic amine 1,8-bis(dimethylamino) naphthalene, known as proton sponge, was evaluated for two uses in steam condensate system: carbonic acid neutralization and steam tracing.

Carbonic Acid Neutralization

An electric boiler test was performed using a phosphate program. The steaming rate of the boiler was 54 ml/min with a discontinuous blowdown of 30 ml every 5 minutes yielding 10 cycles of concentration in the boiler water. The test was run at three pressures to measure the vapor/liquid partition: 600, 1000, and 1500 psig. The goal was to run a coordinate phosphate program with the boiler water containing 10 ppm phosphate at pH between 9-9.5.

Proton sponge was fed by syringe to the deaerator dropleg. Target concentration of the amine was 1 ppm in the feed water. Solubility of the free base proton sponge in water is low so a phosphate salt of the amine was prepared by reacting 1 mole of proton sponge with 1 mole of phosphoric acid. Addition of sodium hydroxide to the resulting solution showed that precipitation of the free base began at about pH=8.2 for the concentration necessary for the syringe solution (1250 ppm). Therefore, a pH of 7.54 was used for the syringe pump solution.

The formula for the syringe pump solution used with a syringe flow of about 0.048 ml/min and feed water flow of 60 ml/min was: 1,8-bis(dimethylamino)naphthalene 1.25 g/l ($5.83 \times 10^{-3}$ M, 1250 ppm) plus 1.14 g/l phosphoric acid adjusted to pH=7.54 with sodium hydroxide. To complete the phosphate program, 5.34 grams of $Na_2HPO_4 \cdot 7H_2O$ and 10 ml of 0.1 N NaOH were added to deionized water in a 50 gallon feed tank. The resulting pH of the boiler blowdown was about 9.

The amine was formulated for syringe pump feed to an electric boiler running on a coordinated phosphate program. A 1250 ppm solution was needed for the syringe pump feed. The correct amount of proton sponge was dissolved in water containing an equimolar amount of phosphoric acid. The pH of this solution was then increased with NaOH and it was noted that the free base began to precipitate at pH=8.2. In order to prevent this precipitation, a pH=7.54 syringe solution was used. Separate tests showed that solutions of several weight percent of 1,8-bis(dimethylamino)naphthalene phosphate could be prepared at lower pH. The amount of phosphate and NaOH in the water contained in the feed tank was adjusted so that the boiler water would contain 10 ppm phosphate at about pH=9.

The vapor/liquid partition ratio of 1,8-bis(dimethylamino)naphthalene was measured at three boiler pressures: 600, 1000 and 1500 psig. As those skilled in the art recognize, volatile species distribute themselves between the gas and liquid phases so that the chemical potential of the species is equal in each phase at equilibrium. An operating boiler is a poor approximation of a system at equilibrium for phase partition so an empirical partition coefficient is used. The vapor/liquid partition ratio ("V/L ratio") is a unitless coefficient that is determined empirically for the conditions of interest.

The V/L ratio describes the distribution of a species between the gas and liquid phases. The V/L ratio is defined as:

$$V/L = \frac{\text{concentration of species in steam}}{\text{concentration of species in water}}$$

The liquid water phase may be boiler water or condensate. The V/L ratio is not an equilibrium constant and is dependent on temperature, pressure, pH, concentration and mass flow.

An ultraviolet ("UV") absorbance method was used to detect the proton sponge in both the condensate and the blowdown. No spectral changes were noted after the amine was exposed to the boiler. No background absorbance was noted in the condensate but there was a background in the blowdown.

Some samples of NaOH were found to contain impurities that absorbed at the 220 nm wavelength. The impurities may originate from the plastic NaOH storage containers. In order to gauge the background, samples of blowdown were taken without the syringe pump in operation. Background absorbance due to the syringe feed appeared to be insignificant. Background from the syringe feed was measured by performing a Beer's law plot on dilutions of the syringe solution blanked against deionized water. However, this cannot rule out development of an absorbing background species when the syringe solution was exposed to the conditions inside the boiler. Underestimation of the blowdown background absorbance could have resulted and would cause an underestimate of the vapor/liquid partition ratios.

Since the high pressure boiler feed pump operates intermittently, a continuous supply of amine to the boiler does not exist. For this reason, small samples of condensate or blowdown taken over a short period of time may not represent the average amine concentration. Determinations of the vapor/liquid partition ratio were made on large samples taken over a period of at least 30 minutes. Even using this technique, determining an accurate vapor/liquid partition ratio at 600 psig was difficult due to the small concentration of amine in the blowdown compared to the background absorbance. The list below shows the vapor/liquid partition ratios determined by averaging at least three values measured on large volume samples.

| Pressure | V/L ratio | 1 standard deviation |
|----------|-----------|----------------------|
| 600      | 18        | 6                    |
| 1000     | 7.04      | 0.16                 |
| 1500     | 2.82      | 0.11                 |

Figure 2:
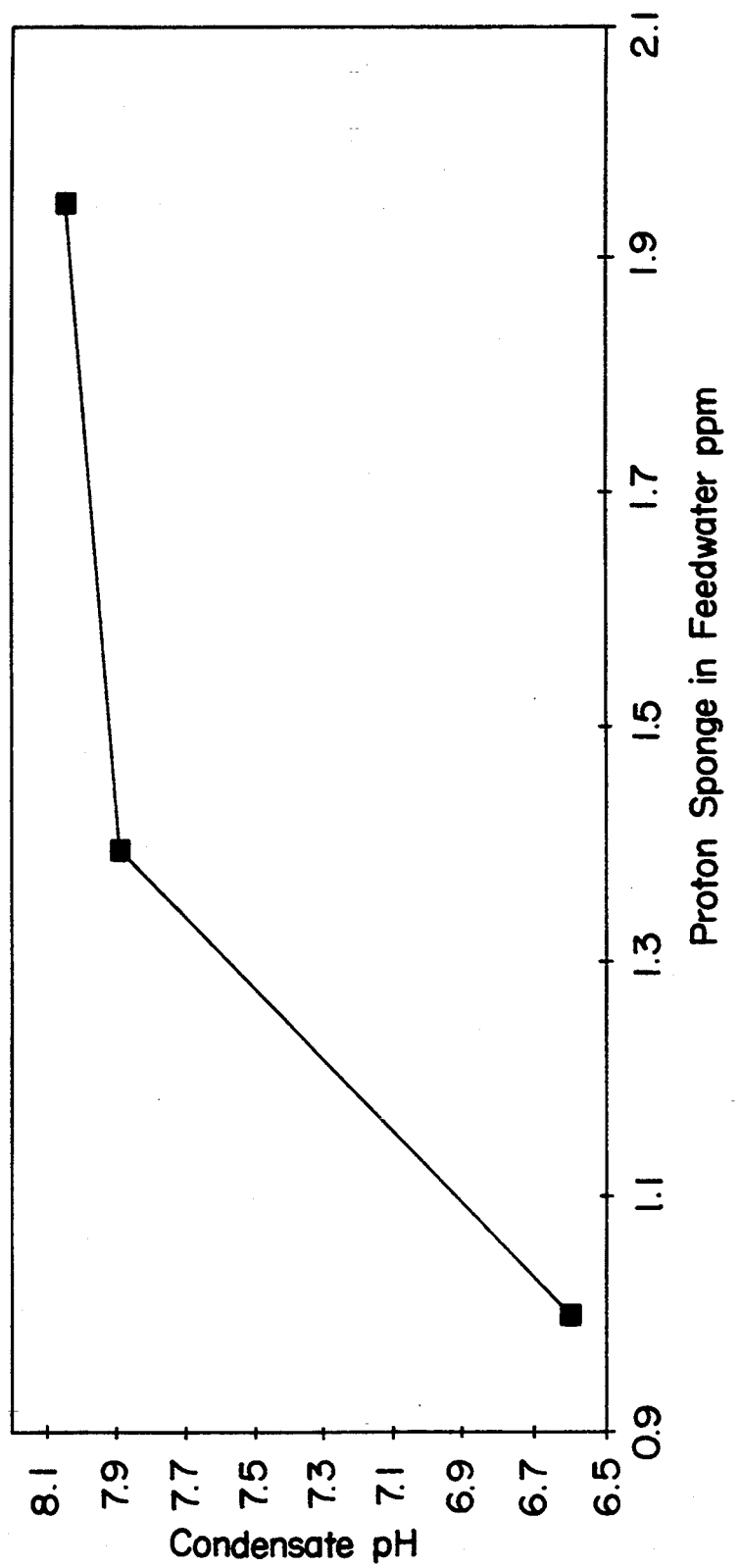
FIG. 2 illustrates graphically condensate pH versus amine feed rate (ppm) for feed water treated with a hindered amine pursuant to the present invention.

Two experiments were performed to show that feeding amine resulted in increased pH in the condensate. In the first experiment a slug of amine was added to the feed water from the syringe pump. After the addition, pH was measured in the condensate while taking grab samples for UV absorbance measurements. FIG. 1 illustrates the correlation of pH to absorbance at 220 nm. The pH is seen to rise with proton sponge concentration. Another test was run by setting the syringe pump at different flow rates. FIG. 2 illustrates the results of the condensate pH versus amine feed rate (ppm) for this second test. In this case, increased amine in the feed water meant increased condensate pH.

Steam Tracing Ability

UV-Vis spectra were obtained on a Bausch and Lomb Spectronic 2000 spectrophotometer. Samples for UV analysis were prepared by adding 3 drops of 0.1 M phosphate buffer at pH=7 to 25 ml of 1,8-bis(dimethylamino)naphthalene stock solution, boiler blowdown, or condensate.

1,8-bis(dimethylamino)naphthalene exhibits two ultraviolet absorptions. There is a broad and relatively weak pH dependent absorption around 300 nm. More usefully, there is a narrower absorption with a maximum at 220.3 nm. The intensity of this band shows a weak pH dependence with the extinction coefficient increasing by about 4 percent between pH 7 and pH 1. The wavelength of the absorption maximum remains constant.

Figure 3:
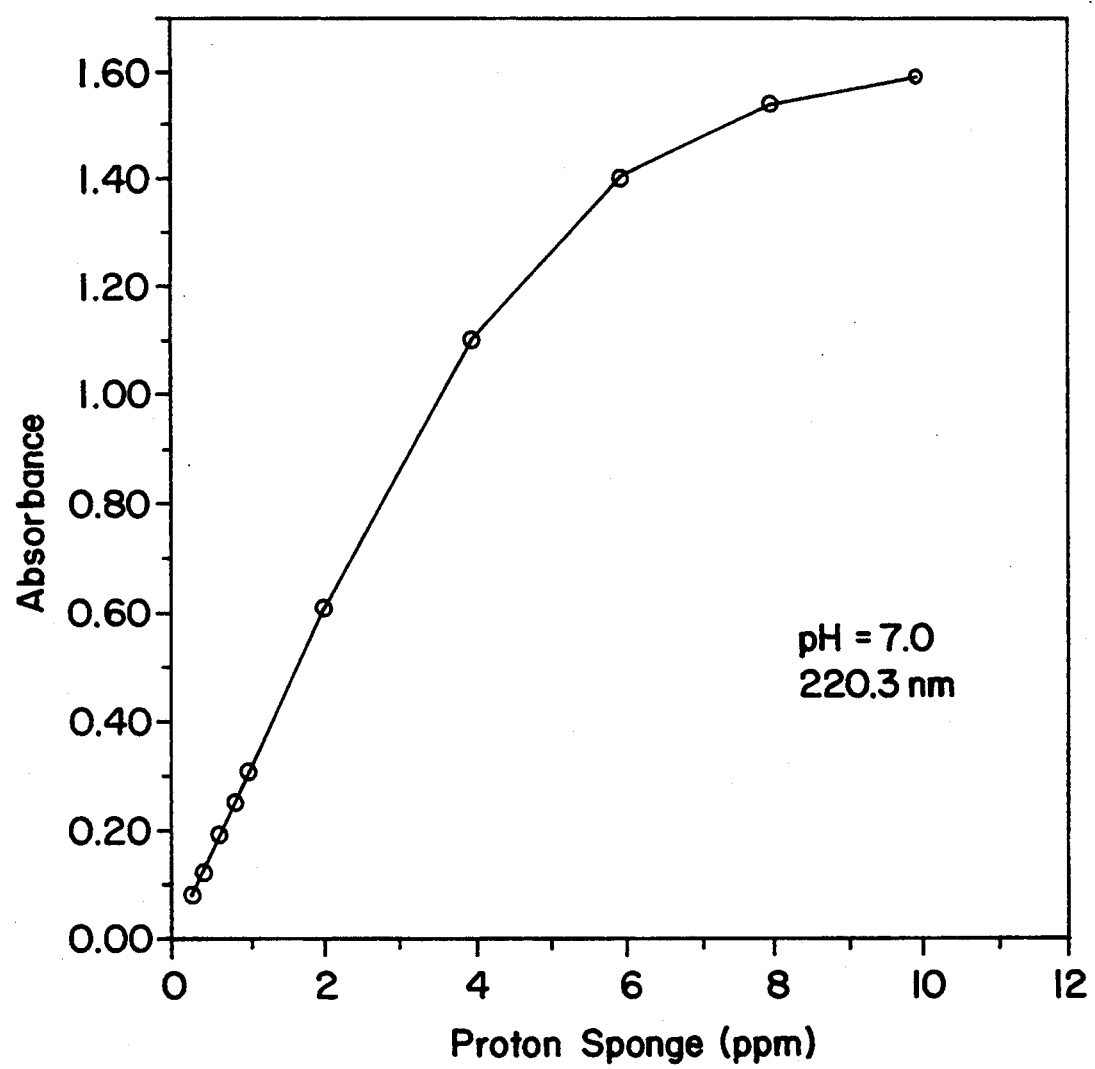
FIG. 3 illustrates graphically absorbance versus proton sponge concentration (ppm) for proton sponge solutions in pH 7 phosphate buffer at 220 nm.

Standard solutions of 1,8-bis(dimethylamino) naphthalene in pH=7 phosphate buffer were prepared and measured at 220.3 nm with deionized water as a blank. The resultant curve is shown in FIG. 3. The response follows Beer's law at concentrations below 2 ppm with the relation A=0.299(proton sponge ppm)+0.0085. A 1 cm cell was used so the extinction coefficient is 0.299 ppm/cm or 64,000 mol $L^{-1}$ $cm^{-1}$. Assuming that the detection limit would be twice the 0.0085 A.U. background (presumably from the phosphate buffer) concentrations as low as 30 ppb could be detected by UV spectrophotometry.

The solubility of 1,8-bis(dimethylamino)naphthalene was measured using UV absorption by heating deionized water with an excess of proton sponge. The solution was heated above the melting point of the amine with vigorous stirring. Upon cooling, the proton sponge recrystallized and after 24 hours a sample of the clear aqueous phase was removed and diluted into the Beer's law range of UV absorption. This saturated solution was found to contain 130 ppm of 1,8-bis(dimethylamino)naphthalene and the pH was measured at about 10.2.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for treating an industrial boiler water system to neutralize carbonic acid formed within the industrial boiler water system comprising the step of adding an effective amount of a sterically hindered amine having a naphthalene group, to the industrial boiler water system to neutralize said carbonic acid.

2. The method of claim 1 wherein the hindered amine is 1,8-bis(dimethylamino)naphthalene.

3. The method of claim 1 wherein the hindered amine is added to the industrial boiler water system in a range from about 0.5 ppm to 20 ppm.

4. The method of claim 1 wherein the system has a steam condensate return and the step of adding an effective amount of hindered amine is further defined by adding an effective amount of the hindered amine to produce a pH between 8.5 and 9.5 in the steam condensate.

5. A method for increasing the purity of steam condensate return in an industrial boiler water system containing carbonic acid comprising the step of adding an effective amount of a sterically hindered amine having a naphthalene group, to the industrial boiler water system to neutralize said carbonic acid.

6. The method of claim 5 wherein the hindered amine is 1,8-bis(dimethylamino)naphthalene.

7. The method of claim 6 further comprising the step of detecting the concentration of the hindered amine by measuring the ultraviolet absorption of the hindered amine in said industrial boiler water system.

8. The method of claim 5 wherein the hindered amine is added to the industrial boiler water system in a range from about 0.5 ppm to 20 ppm.

9. The method of claim 5 wherein the step of adding an effective amount of hindered amine is further defined by adding an effective amount of the hindered amine to produce a pH between 8.5 and 9.5 in the steam condensate.

* * * * *